March 24, 1942. W. L. DAVIS 2,277,080
HEDGE TRIMMER
Filed Nov. 20, 1940 2 Sheets-Sheet 2
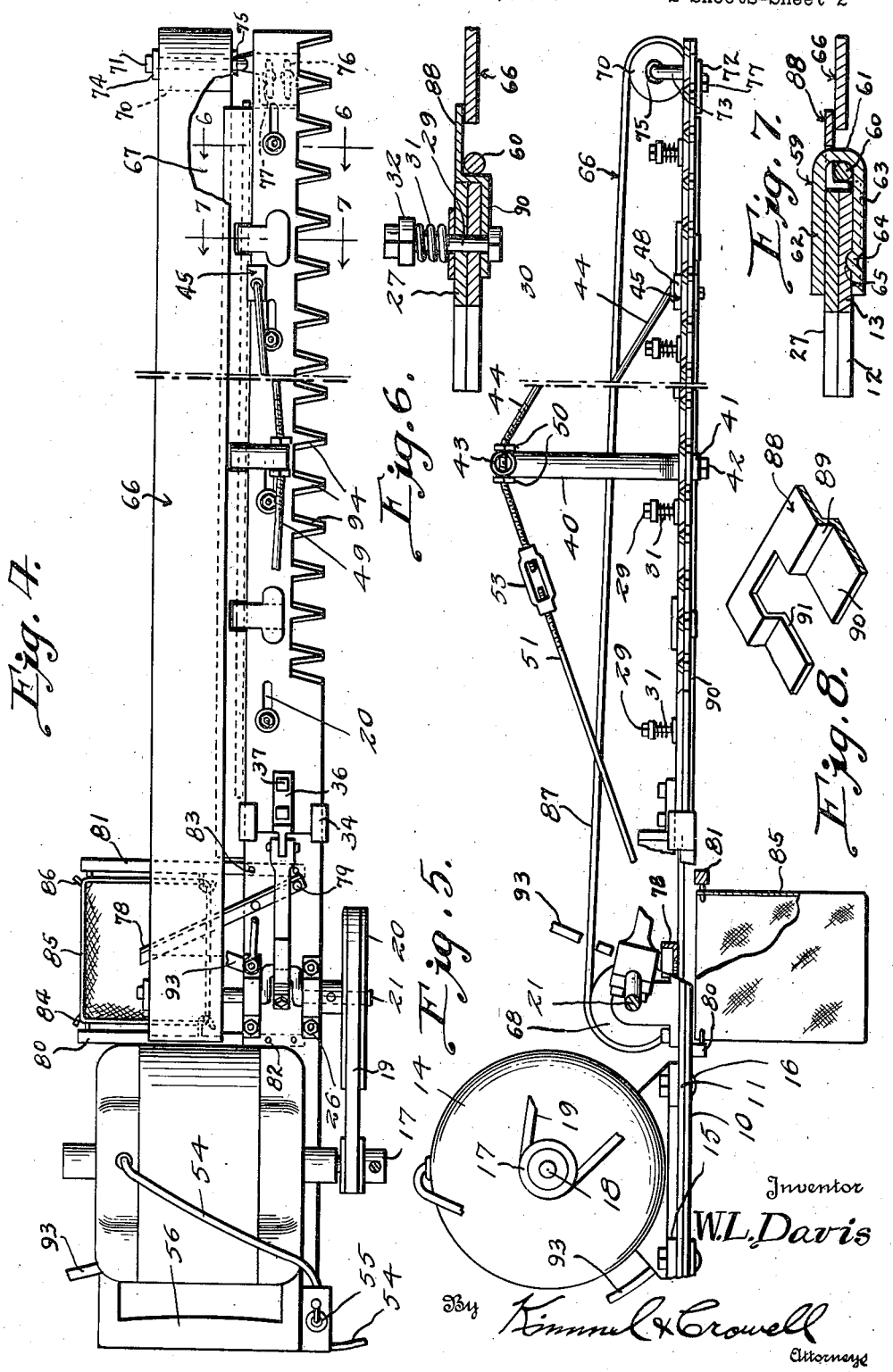
Inventor
W. L. Davis
By Kimmel & Crowell
Attorneys Patented Mar. 24, 1942

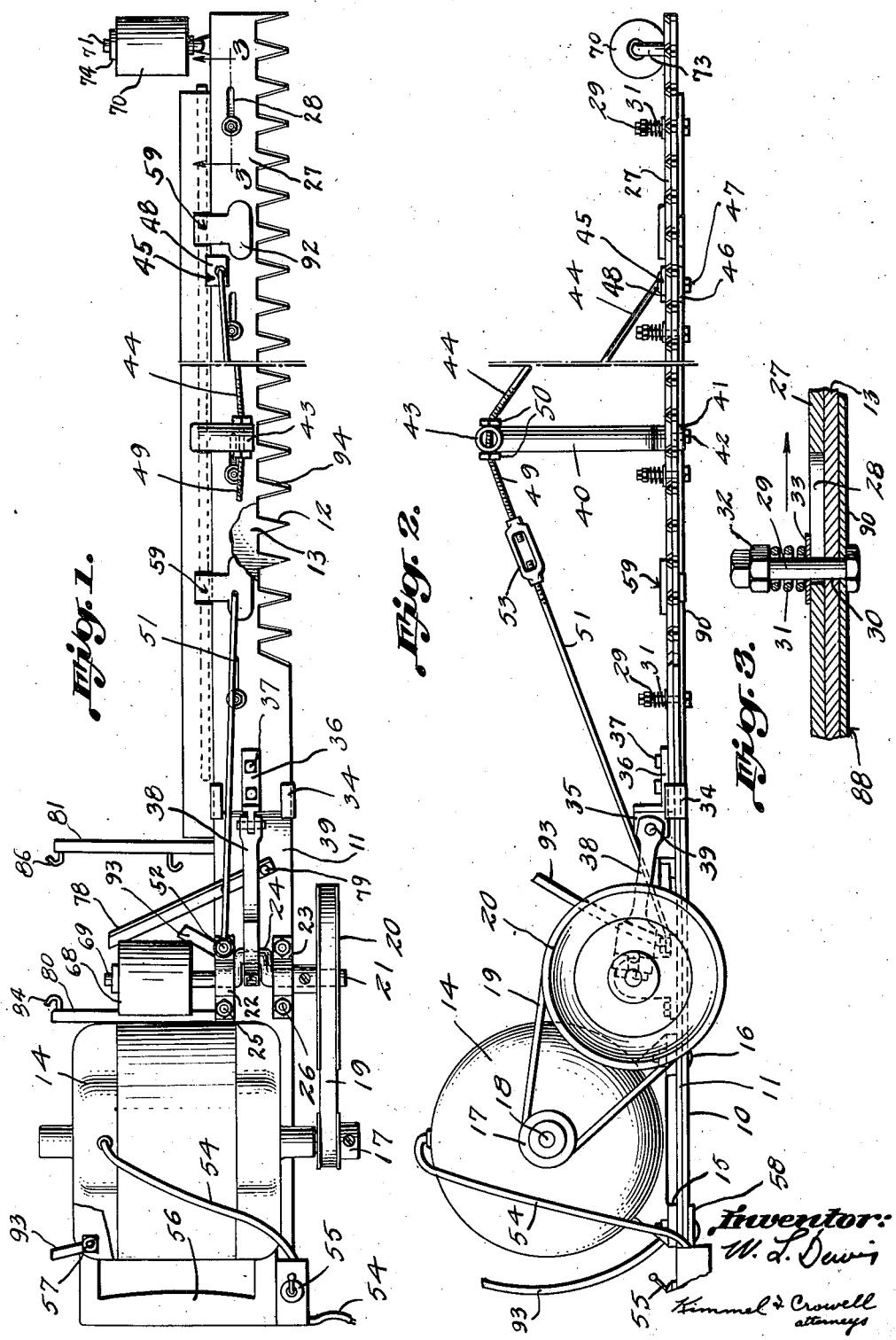

2,277,080

UNITED STATES PATENT OFFICE 2,277,080

HEDGE TRIMMER

William Lawrence Davis, Alexandria, Va.

Application November 20, 1940, Serial No. 366,487

9 Claims. (Cl. 30—124)

This invention relates to hedge cutters and more particularly to an electrically operated cutter.

An object of this invention is to provide a cutter of this type which can be used for horizontal or vertical cutting.

Another object of this invention is to provide an improved connection between the power member and the cutter so that the power member will be relieved of undue strain caused by cutting of heavy twigs or branches.

A further object of this invention is to provide a cutter of this type which includes means for collecting the cuttings as the cutter moves over the hedge so that the trimmed portion of the hedge will be smooth and clean.

A still further object of this invention is to provide an improved means for holding the cutting blades in sliding contact with each other.

To the foregoing objects and to others which may hereinafter appear, the invention consists of the novel construction, combination and arrangement of parts as will be more specifically referred to and illustrated in the accompanying drawings wherein are shown embodiments of the invention, but it is to be understood that changes, variations and modifications may be resorted to which fall within the scope of the invention as claimed.

In the drawings:

Figure 1 is a detail top plan partly broken away of a hedge trimmer constructed according to an embodiment of this invention, certain parts of the device being removed.

Figure 2 is a detail front elevation of the device.

Figure 3 is an enlarged fragmentary sectional view taken on the line 3—3 of Figure 1.

Figure 4 is a detail top plan partly broken away of the device in assembled condition.

Figure 5 is a detail front elevation partly broken away and in section of the device.

Figure 6 is an enlarged sectional view taken on the line 6—6 of Figure 4.

Figure 7 is an enlarged sectional view taken on the line 7—7 of Figure 4.

Figure 8 is a fragmentary perspective view of the combined guard and cuttings guide.

Referring to the drawings, the numeral 10 designates an elongated supporting plate or bar on which an elongated stationary cutter bar extension 11 is secured. The stationary cutter bar extension 11 extends forwardly beyond the forward end of the supporting bar 10 and is provided with stationary cutting teeth 12 which extend from the body 13 of the stationary cutter bar. An electric motor 14 has the base 15 thereof secured as by fastening devices 16 to the supporting member 10 and the cutter bar extension 11, the base 15 of the motor 10 being preferably secured at one end to the cutter bar extension 11 and the supporting bar 10, so that the major portion of the motor 14 will be disposed in laterally projecting relation with respect to the cutter bar extension 11.

The motor 14 has a grooved driving pulley 17 secured to the shaft 18 thereof and an endless belt 19 is trained about the driving pulley 17. A driven pulley 20 which is substantially larger in diameter than the driving pulley 17 is mounted on one end of a crank shaft 21. The crank shaft 21 is journalled in a pair of bearings 22 and 23, the offset portion 24 of the crank shaft being positioned between the two bearings 22 and 23. The bearing 22 is secured by fastening devices 25 to the extension 11 and the bearing 23 is secured to the extension 11 by fastening devices 26.

A movable cutter bar 27 is slidingly disposed on the upper surface of the stationary cutter bar formed by the body 13 and the teeth 12 and preferably the movable cutter bar 27 is provided with a plurality of elongated slots 28 through which tensioning bolts 29 engage. The tensioning bolts 29 are extended through openings 30 provided in the body 13 and the movable cutter member 27 is tensioned relative to the body 13 by means of a spring 31 which engages about each tensioning bolt 29 and is interposed between nuts 32 and the upper face of the cutter 27.

A washer 33 is interposed between the lower end of the spring 31 of the upper face of the cutter 27. The supporting member 10 at its forward end is provided with a pair of opposed substantially L-shaped guide members 34 which engage over the upper inner end of the movable cutter 27 so as to slidingly guide the movable cutter 27 as it is reciprocated back and forth by the motor 14. An upstanding head 35 which has formed integral therewith a right angularly disposed base 36 is secured to the inner end of the movable cutter 27 by fastening devices 37. One end of a pitman 38 is pivotally secured to the head 35 by means of a pivot member 39 and the opposite end of the pitman 38 is pivotally mounted on the offset 24 of the crank 21.

In order to provide a means whereby the two cutter members 13 and 27 may be braced against longitudinal bending, I have provided an upstanding post 40 which is provided with a flattened right angularly disposed base 41. The base 41 is secured by a fastening device 42 to the stationary cutter body 13 on the rear side of the teeth 12. The post 40 is provided at its upper end with a right angularly disposed handle 43 and one end of a bracing bar 44 engages through the handle 43. The other or forward end of the bracing member 44 is secured to a U-shaped guide member 45 which has one leg 46 thereof engaging beneath the stationary cutter member 13 and is fixed thereto by a fastening device 47.

The other or upper leg 48 of the guide member 45 engages over the upper surface of the movable cutter 27 at the rear edge thereof. The inner end portion of the bracing member 44 is provided with threads 49 and a pair of nuts 50 are threaded onto the inner end portion of the bracing member 44 and engage on opposite sides of the handle 43. A second bracing member 51 is secured as at 52 to the bearing member 22 and a turnbuckle 53 is threaded onto the outer end of the bracing member 51 and is also threaded onto the threads 49 of the bracing member 44. The two bracing members 44 and 51 comprise a truss structure by means of which the two cutter members 13 and 27 may be braced against longitudinal bending.

The motor 14 is connected to a suitable source of electric current supply by a double wire conduit 54 and preferably a switch 55 is interposed in the conduit 54. The switch 55 is mounted on a U-shaped handle 56 which is secured as at 57 to the rear end of the base 15 of the motor 14 and the other end of the handle 56 is secured as at 58 to the underside of the supporting member 10.

In order to provide a means for yieldably holding the two blade members 13 and 27 together, I have provided a plurality of longitudinally spaced apart U-shaped clips or blade tensioning members 59. The U-shaped blade tensioning clips 59 engage over the rear edges of the blades 13 and 27 and extend forwardly. An elongated connecting bar 60 is secured in the bight 61 of the clips 59 and is positioned longitudinally of the rear edges of the blades 13 and 27. One leg 62 of each clip 59 slidingly engages the upper surface of the movable blade 27 and the other or lower leg 63 of each clip 59 is provided with a detent 64 which engages in a recess 65 formed in the under surface of the stationary blade member 13.

In order to provide a means whereby the cuttings of the blades 13 and 27 may be removed from the upper surface of the hedge as the device is moved therealong, I have provided an endless belt 66 which has the lower run 67 thereof disposed in substantial alignment with the upper surface of the movable cutter 27. The belt or conveyor 66 is trained about a driving pulley or drum 68 which is mounted on a crank shaft extension 69 extending rearwardly from the offset 24.

The belt 66 is also trained about an idler pulley 70 which is mounted on a stationary shaft 71. The stationary shaft 71 is disposed at the forward ends of the blades 13 and 27 and is supported in upwardly offset relation with respect thereto by means of a base plate 72 which is provided with a right angularly disposed and vertically extending arm 73 which is formed integral with the base 72 and with the stationary shaft 71. The idling pulley 70 may be retained on the stationary shaft 71 by means of collars 74 and 75 which are fixed to the shaft 71 at opposite ends of the pulley or drum 70. The base 72 is provided with a pair of elongated slots 76 through which fastening members 77 engage. The fastening members 77 with the slots 76 provide a means whereby the belt 66 may be maintained in the desired taut relation so that the lower run 67 thereof will not sag.

A belt cleaning rake or plow member 78 which is substantially L-shaped in transverse section is disposed in contacting relation with the upper surface of the lower run 67 of the belt and is positioned closely adjacent the driving pulley or drum 68. The belt cleaning member 78 is disposed on an obtuse angle to the length of the belt 66 and is secured by fastening devices 79 to the upper surface blade extension 11. A pair of rearwardly extending bag supporting arms 80 and 81 are secured by fastening devices 82 and 83 to the supporting member 10 on the underside thereof and the arm 80 is provided with a pair of hooks 84 which are adapted to be engaged in a bag or receiver 85.

The arm 81 is provided with a pair of hooks 86 which are adapted to be engaged with the bag 85 so that the open mouth of the bag 85 will underlie the rear portion of the belt 66 in a position to receive the cuttings as they are taken off of the lower run 67. The upper run 87 of the belt 66 is adapted to engage any large branches or twigs which do not fall between the two runs of the belt and is adapted to carry these branches or twigs in the opposite direction from the smaller cuttings which engage the lower run 67.

In order to provide a means whereby the cuttings may be guided onto the lower run 67 of the belt, I have provided an elongated guide member 88 which is disposed with the upper surface thereof substantially flush with the upper surface of the movable blade 27. The guard or guide member 88 overlies the upper surface of the lower run 67 of the conveyor belt and the forward end of the guard or guide member 87 is provided with a right angularly disposed extension 89. The extension 89 is adapted to engage between the connecting bar 60 and the rear edges of the two blades 13 and 27 and a forwardly disposed extension 90 extends from the lower edge of the vertical extension 89 and is adapted to be secured beneath the heads of the blade tensioning bolts 29.

The guide member 88 is provided with openings 91 through which the legs 62 and 63 of the clips 59 are adapted to project. Each clip or blade tensioning member 59 has an enlarged head 92 which is integral with the upper leg 62 so as to thereby provide a large contacting surface for engagement with the movable cutting blade 27.

In order to provide a means whereby the device hereinbefore described may be supported from the shoulders of the user, I have provided a flexible shoulder strap 93 which is adapted to be secured at one end to the base of the motor 14 and may be secured at the other end to one of the fastening members 26.

In the use and operation of this device, the motor 14 is adapted to be connected to a source of electric current supply and where it is desired to cut the upper horizontal portion of a hedge, the blade members 13 and 27 are disposed in the desired position over the top of the hedge. The operation of the motor 14 will reciprocate the movable blade 27 so that the cutting teeth 94 thereof will coact with the teeth 12 of the lower blade 13 in cutting the branches or twigs forming the top of the hedge.

As the crank shaft 21 rotates, the lower run of the belt 66 will move toward the inner end of the device and the cuttings from the top of the hedge will pass over the guard member 88 and be drawn inwardly toward the driving pulley 68. The plow or rake 78 will force the cuttings rearwardly into the open mouth of the bag 85 which is supported from the bag supporting arms 80 and 81. The larger branches which are cut by the cutting blades will move in the opposite direction and will drop over the far edge of the hedge. With a device of this kind, the top of the hedge will be maintained in a clean condition rearwardly of the cutting blades so that it will not be necessary to rake the top of the hedge in order to remove the cuttings.

By providing a flexible connection in the form of an endless flexible belt 19 between the motor 14 and the driven member 20, in the event any relatively thick branches are engaged by the cutting blades, the strain on the cutting blades caused by such thick branches will be absorbed by the belt 19 which will permit a slight slippage between the driving pulley 17 and the driven pulley 20.

When it is desired to use the device hereinbefore described for cutting the opposite vertical sides of a hedge, the belt 66 may be removed and the bag 85 may also be removed from the hooks 84 and 86. However, it is not essential that the belt 66 be removed as if desired, this may be left on the device when cutting the vertical faces of the hedge. During the cutting of the hedge, one hand of the operator may be engaged with the handle 56 and the other hand of the operator engaged with the handle 43 which overlies the cutting blades. In this manner the blades may be firmly held in the desired cutting position with the weight of the motor 14 and the inner end of the device being substantially borne by the shoulder strap 93.

What I claim is:

1. A hedge trimmer comprising a pair of cutters, means for reciprocating one of said cutters, a plurality of U-shaped cutter tensioning clips each having the bight thereof disposed at the rear edges of said cutters, one leg of each clip slidingly engaging the upper surface of said one cutter and the other leg of each clip engaging the under surface of the other cutter, said other cutter having a plurality of recesses therein and each other leg of a clip having a detent engageable in a recess, and a connecting bar fixed to the bights of said clips.

2. A hedge trimmer comprising a stationary cutter, a reciprocal cutter, means for reciprocating said reciprocal cutter, a collector, means supporting said collector at one end of said cutters, an endless means for conveying the cuttings in the direction of said collector including an upper and a lower run, a guard means for the cuttings overlapping a part of said lower run, and means for discharging the cuttings from said conveyor from off said lower run into said collector.

3. A hedge trimmer comprising a stationary cutter, a movable cutter, means for moving said movable cutter relative to said stationary cutter and means for tensioning said cutters relative to each other, said tensioning means including a plurality of U-shaped resilient clips adapted to yieldably hold said cutters therebetween, said clips and one of said cutters including correlated means for holding said clips against movement.

4. A hedge trimmer comprising a stationary cutter, a reciprocal cutter, means for reciprocating said reciprocal cutter, a collector, means supporting said collector at one end of said cutters, means for conveying the cuttings in the direction of said collector, a guide fixed to said stationary cutter and overlapping one run of said conveying means for guiding the cuttings from said cutters toward said conveying means, and a stationary rake engageable with one run of said conveying means for discharging the cuttings into said collector.

5. A hedge trimmer comprising a stationary cutter, a reciprocal cutter, means for reciprocating said reciprocal cutter, and means for bracing said cutters against bending, said bracing means comprising a vertically disposed post fixed to said stationary cutter, a pair of bracing rods, means securing an inner end of one rod to said stationary cutter adjacent the inner end thereof, a U-shaped member disposed adjacent the outer ends of said cutters, and having the parallel legs thereof overlapping said cutters, means securing one leg of said U-shaped member to said stationary cutter, means securing the outer end of the other of said rods to the other leg of said U-shaped member, means securing the inner portion of said other rod to said post adjacent the upper end thereof, and a turnbuckle connecting the adjacent ends of said rods together.

6. A hedge trimmer comprising a pair of cutter members, an extension carried by one of said members, a reinforcing bar fixed to said extension, a pair of L-shaped guide members carried by said bar disposed in overlapping relation with respect to the other of said cutter members, said other cutter member having a plurality of elongated openings therethrough, tensioning members engaging through said openings and fixed relative to said one member, truss means holding said cutter members against longitudinal bending, and means for reciprocating the other of said cutter members.

7. A hedge trimmer comprising a pair of cutter members, an extension carried by one of said members, a reinforcing bar fixed to said extension, a pair of L-shaped guide members carried by said bar disposed in overlapping relation with respect to the other of said cutter members, said other cutter member having a plurality of elongated openings therethrough, tensioning members engaging through said openings and fixed relative to said one member, truss means holding said cutter members against longitudinal bending, means for reciprocating the other of said cutter members, a plurality of U-shaped cutter member tensioning members, and means extending along the rear edges of said cutter members connecting said U-shaped tensioning members together.

8. A hedge trimmer comprising a pair of superposed cutters, an extension carried by one of said cutters, a supporting bar fixed to said extension, said extension and supporting bar adapted to support a driving means, an endless conveyor means supported rearwardly of said cutters with one run thereof coplanar with the uppermost of said cutters, means connecting said conveyor with said driving means, a stationary guard member for the cuttings having a part arranged below the other of said cutters and a part substantially flush with the upper face of the reciprocatory cutter and overlying the forward marginal portion of the upper surface of said one run of the conveyor, and means fixed to said extension and engaging said one run of said conveyor for raking the cuttings therefrom.

9. A hedge trimmer comprising a pair of superposed cutters, an extension carried by one of said cutters, a supporting bar fixed to said extension, said extension and supporting bar adapted to support a driving means, an endless conveyor means supported rearwardly of said cutters with one run thereof coplanar with the uppermost of said cutters, means connecting said conveyor with said driving means, a stationary guard member for the cuttings having a part arranged below the other of said cutters and a part substantially flush with the upper face of the reciprocatory cutter and overlying the forward marginal portion of the upper surface of said one run of the conveyor, means fixed to said extension and engaging said one run of said conveyor for raking the cuttings therefrom, a receiver for the cuttings, and means dependingly supporting said receiver in a position to receive the cuttings from said raking means.

WILLIAM LAWRENCE DAVIS.